United States Patent [19]
Constant

[11] 3,790,939
[45] Feb. 5, 1974

[54] REAL TIME SYNTHETIC RADAR

[76] Inventor: James Nickolas Constant, 1603 Danbury Dr., Claremont, Calif. 91711

[22] Filed: May 12, 1972

[21] Appl. No.: 252,711

Related U.S. Application Data

[63] Continuation-in-part of Ser. No. 46,409, June 15, 1970, abandoned.

[52] U.S. Cl. ........ 343/10, 343/5 CM, 343/17.2 PC, 343/17.5
[51] Int. Cl. ........................................... G01s 9/233
[58] Field of Search ... 343/5 CM, 10, 17.2 PC, 17.5

[56] References Cited
UNITED STATES PATENTS
3,662,384    5/1972    Albert.......................... 343/5 CM X Primary Examiner—T. H. Tubbesing
Attorney, Agent, or Firm—Harris, Kern, Wallen & Tinsley

[57] ABSTRACT

A coherent synthetic aperture radar with a scanning transmitter beam and a data processor, preferably operating in real time and preferably with CW transmitter operation, providing target coordinates, including range, without requiring comparison of echo and transmitted pulses for range data.

14 Claims, 6 Drawing Figures

PATENTED FEB 5 1974  3,790,939

REAL TIME SYNTHETIC RADAR

This application is a continuation-in-part of my copending application Ser. No. 46,409, filed June 15, 1970, now abandoned.

This invention relates to improvements in synthetic radar systems and more particularly to the improvement of the time element which is required to detect and resolve objects using synthetic radars. By means of such improvements the data which is obtained by the synthetic radar is made immediately available to the radar operator in real time instead of the usual storage and later playback of data. This is accomplished by scanning the object with a coherent radar beam, angle correlating the signals between successive scans of the object to obtain the object range, then summing doppler signals to obtain high object resolution in angle and object direction in angle. This technique can be achieved efficiently in real time with small size and weight radar components.

In many instances, it is desirable to resolve between objects. Typical examples are in the fields of ground mapping by satellite or aircraft, air surveillance by ground radar, underwater surveillance by sonar, and label reading in the transportation, manufacturing, inventory control and postal industries. In these fields it often happens that the resolution of objects cannot be obtained in real time with small size and weight sensing equipment. To obtain satisfactory resolution with small size and weight equipment often requires the storing of data and playback at later times. Therefore, a suitable device or technique, such as the real time synthetic radar, must be provided to accomplish the real time resolution of objects with small size and weight equipment. The real time synthetic radar permits the objects being examined by the radar to be resolved in real time using conventional radar processing techniques.

Several examples of devices for resolving objects in real time are presently in use based mainly on radar, optical, or sonar principles for their operation. In each of these types of devices, the main criteria which determine their effectiveness in many applications are physical size and weight, range of operation, and resolution. The physical size and weight of a device often critically determines the range of operation and resolution that can be obtained by the device. Thus, constraining the size and weight of a device, in many applications, limits the range of operation and resolving power of the device. Range of operation is a term which denotes the ability of the device or observing instrument to detect objects at a distance in a hostile, natural or man-made, environment or in the presence of influences or reflections from other objects in the instrument field of view. The term resolution is most frequently used to denote the smallest extension between objects which the device or observing instrument is able to separate or differentiate.

In a non-synthetic radar the range of operation and resolution which can be obtained is critically limited by the system bandwidth-duration product (for range and velocity resolution) and the beamwidth (for angular resolution). In a synthetic radar the angular resolution is limited only by the dimension of the antenna aperture. In the former case above, the attainment of satisfactory range of operation and resolution is accomplished by increasing the system bandwidth-duration product and antenna size. This is true to a certain extent in the latter case, inasmuch as the higher bandwidth-duration product is needed for better resolution of objects in range and in velocity and a smaller antenna size is needed for better resolution of objects in angle. Therefore, the synthetic radar system tends to be considerably smaller and weighs less than does a non-syntheic radar system for the same level of range of operation and resolution. This advantage however is offset by the fact that the synthetic radar tends to limit the system ability to detect and resolve objects in real time excepting unless a larger and heavier system is provided. The added hardware is not compatible, efficient, and economic for many applications.

This invention relates to a high resolution radar system, and particularly concerns apparatus for effecting the scanning of a synthetically generated antenna. There is a need for a small and cheap yet accurate and fast radar that does not require a large antenna, a large transmitter, a large receiver, and a large data processor and which is characterized by simplicity, small size, small weight, and minimal power consumption.

A typical application of such a system is the mapping of the ground from aircraft or satellites. Other applications of such a system are the surveillance of aircraft and satellites from the ground and the reading of labels, characters, patterns, and the like.

Conventional radars have a serious deficiency when used in aircraft or satellites for viewing the ground by virtue of a lack of resolution or ability to distinguish objects that are close together. The resolution in these systems is limited by the pulse length and the antenna beamwidth. By making the pulse length quite short, relatively high range resolution may be obtained at the exposure of poorer range. The system range can be maintained at the expense of larger, heavier, and more power consuming components for both the system transmitter and receiver. The antenna beamwidth can be made quite narrow at the expense of increasing the size of the antenna. The price in terms of practicability of equipment of greatly improved range and angular resolution is out of question in conventional non-coherent radars. Either very large, heavy, and power consuming components, and a very large antenna are required, or a very short wavelength must be used. A long antenna (e.g., 10 feet or more) is generally not practical for satellite applications and many aircraft applications as well. Large size, heavy, and power consuming equipment are not practical for either satellite or aircraft applications. Very short wavelengths suffer from atmospheric absorption and present design difficulties at high power level.

Conventional synethtic radar systems utilizing a synthetically generated antenna (a simulated long linear array) may achieve, in some cases, the same angular resolution with an antenna of relatively small aperture, as would normally be obtainable with an antenna hundreds of feet long. However, such radars are of the side-looking non-scanning variety and utilize time consuming data processing systems (stored time operation). In addition, these systems provide angular resolution but in a single dimension. Range resolution is obtained in these systems in much the same way as is the case with conventional non-synthetic radars and consequently at the expense of larger, heavier, and more power consuming equipment.

Synthetic radar systems of the scanning variety utilizing a synthetically generated antenna may achieve, in some cases, both range and angular resolution with an antenna of relatively small aperture. However, these radars are not capable of generating long lengths of synthetic antenna. Typical lengths of synthetic antenna in such systems are on the order of 10 feet. No significant improvement in the system resolution over conventional radar systems can be obtained unless relatively long synthetic antenna lengths can be generated. In addition, range resolution is obtained in these systems in the conventional manner and consequently at the expense of equipment size, weight, and power consumption.

A practical scanning synthetic radar system should be operable without a large antenna, without large, heavy, and power consuming components, without being restricted to operate at extremely high microwave frequencies, without being constrained to operate time consuming data processing systems, and must be capable of generating extremely long lengths of synthetic antenna.

The present suggested systems have not met these requirements. Conventional non-coherent radar systems are large in size and weight, consume large amounts of power, and tend to operate at high microwave frequencies. Synthetic radar of the non-scanning variety have time consuming data processing systems and one dimensional capability. Synthetic radar of the scanning variety have short synthetic antenna lengths.

There are distinct technical and economic limitations with respect to any radar which is adapted to ground mapping, surveillance, or reading applications. One problem in connection with such systems has to do with the limited confines of aircraft and satellites. As an example, a typical satellite radar must utilize no greater than several cubic feet of space, weigh less than several hundred pounds, and consume less than several kilowatts of power. Such radars must have the smallest size, weight, and power requirements. These radars therefore must operate at CW or must possess the smallest possible bandwidth-duration product for the hardware since, as a general rule, this product is more or less proportional to the system size, weight, and power requirements and therefore to the system complexity and cost. Another problem in connection with such systems has to do with the large number of systems to be utilized in some applications. As example, an airport surveillance system must be of low cost since many of them are to be utilized. Accordingly, the use of conventional non-coherent or coherent systems is out of question because of excessive cost. The radars in such applications must be simple and cheap.

The present invention utilizes a scanning synthetic aperture technique which results in small antennas, transmitters, receivers, data processors, and displays and results in a light-weight system of small power consumption. The system operates in real time using components of small bandwidth-duration product to generate extremely long synthetic antenna lengths. The system can operate in either a focused or unfocused configuration. The radar is an active device which utilizes a simple CW frequency, a narrowband receiver, antenna(s) of small physical size, a pulse compression filter, and a simple CRT display, all these components being packaged in a small size package. As example, in a typical satellite application the system size is approximately one cubic foot, the system weight less than eighty pounds, and the system power consumption less than one kilowatt of power. Although the system can also be operated in pulsed form, this is not needed for obtaining range and range resolution since these quantities are obtained through the angular correlation of pulses in the system. The radars presently known to applicant for producing similar results weigh in the order of 2,000 pounds.

It is a general object of the invention to provide such a new and improved radar system which overcomes the disadvantages of the prior art systems. A particular object is to provide a scanning synthetic radar capable of generating an extremely long synthetic antenna. Another object is to provide a simple and cheap scanning synthetic radar of extremely high resolution.

The present invention is also directed to a synthetic radar which detects and resolves objects in real time and yet overcomes the problems and limitations of size and weight often encountered in the design of more conventional synthetic radar systems. In accordance with the present invention, conventional radar techniques are employed which permit the operation of a synthetic radar in real time. The real time synthetic radar in accordance with the present invention has high detection and resolving powers as well as compatible physical size and weight for the device thus permitting a significant extension of the range of applications for such devices.

Utilizing the system of the present invention data may be obtained by a synthetic radar which will permit its operation in real time.

It is therefore a further objective of this invention to provide an efficient technique using conventional radar circuits which can be utilized by a synthetic radar to obtain the detection and resolution of objects in real time.

Another objective of this invention is to provide a synthetic radar system which is capable of operation in real time and which can be characterized as having small size and weight.

A further objective of this invention is to provide a synthetic radar system with compatible physical size and weight, high detecting and resolving powers and capable of operating at long range separations between the observing instrument and the object being observed.

The apparatus of the invention provides a coherent synthetic aperture radar with a scanning transmitter beam and a data processor, preferably operating in real time and preferably having CW transmitter operation, providing coordinates of a target, including range, without requiring the comparison of echo and transmitted pulses for obtaining the range data. The system may utilize conventional components presently known and reference may be made to the prior art, including that listed below, for specific details of the various components. The data from the receiver of the radar may be treated in the conventional manner to provide the target coordinates, i.e., the range and angle information, and preferably the data processor is operated in real time to provide the target information in real time. Any of the presently available displays can be utilized if desired.

In the radar system of the present invention, range information is obtained without requiring a pulse from the transmitter, the scanning producing the range information. For longer range operation, a pulsed transmitter operation might be utilized because of power requirements but such transmitter pulsing is not utilized in the range data generation. In the preferred embodiment utilizing CW transmission and an FM circulating delay line in a real time data processor, a typical unit may weigh in the order of 100 pounds. This is possible because no modulator is required for the transmitter, the receiver is simplified by deleting the requirement for handling the transmitter pulse for ranging, the data processor requires fewer channels and the recirculating delay line is substantially smaller than other real time data processor.

Other objects, advantages, features, and results will more fully appear in the course of the following description. The drawings merely show and the description merely describes preferred embodiments of the present invention and are given by way of illustration or example.

Figure 1:
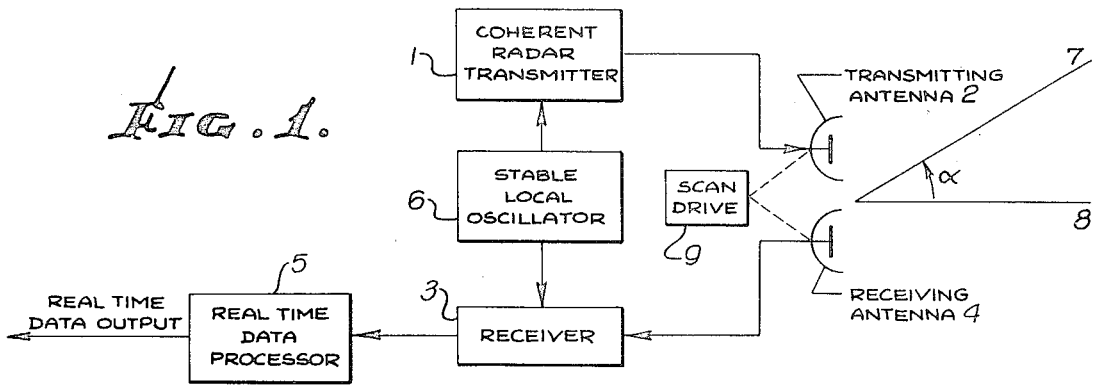
FIG. 1 is a block diagram of a real time synthetic radar system incorporating the present preferred embodiment of the invention.

In order to describe the real time synthetic radar reference is made to FIG. 1. The system in a preferable configuration consists of the radar transmitter 1, transmitting antenna 2, receiver 3, receiving antenna 4, antenna scan drive 9, and real time data processor 5. A stable oscillator 6 serves as a common reference source for both the transmitter 1 and receiver 3; i.e., the radar is coherent. The synthetic radar may be any one of any number of types subject only to the constraints imposed in its use in conjunction with the data processor 5, which preferably operates in real time. The transmitter 1 produces a frequency which is located preferably in the radar, optical or acoustic portions of the electromagnetic frequency spectrum. The frequency of the transmitter is preferably fixed. The exact frequency used in any case is determined by the application of hand. Any of the well known types of frequency transmitters capable of producing oscillations at the needed frequencies may be utilized, the particular type of oscillator and associated radar circuits forming no part of this invention. The transmitting 2 and receiving 4 antennas have beamwidths determined by the application at hand and are preferably capable of being scanned. Although a dual antenna system has been indicated in the figure it is also possible to implement the system of the present invention having a single antenna. Any of the well known types of antennas capable of providing the needed beamwidth and scanning may be utilized. Although the system of the present invention will be described as a scanning system, it can operate equally well as a non-scanning system (which may be considered but a special case of the scanning system, i.e., for which $\beta = 2\pi$, $\omega = 0$).

The receiver 3 has a bandwidth which passes the shortest pulse or widest modulation bandwidth encountered in the radar. The exact band-width in any one case is determined by the application at hand. Any of the well known types of radio receivers capable of providing the needed bandwidth may be utilized, the particular type of receiver and associated radar circuits forming no part of the present invention.

The real time data processor 5 has a bandwidth which passes the shortest pulse or widest modulation bandwidth encountered in the radar signal and integrates or correlates pulses at the pulse repetition rate or in the absence of pulses at a rate which is determined by the signal modulation bandwidth. The exact bandwidth, integration or correlation functions, are determined by the application at hand. Any of the well known types of pulse or signal integrators, correlators or pulse compression filters capable of providing the needed functions may be utilized.

In the synthetic radar system, the transmitting 2 and receiving 4 antennas are boresighted along the same line or axis 7 which rotates in space about the fixed reference line or scan axis 8 thus describing a cone about this line with apex at the radar. The transmitting and receiving beamwidths or angles of scan in the plane of lines 7 and 8 are equal to twice the angle $\alpha$ between lines 7 and 8. The beamwidth or angle of scan $\beta$ in the plane normal to the plane of the figure and which contains line 7 is programmed for each particular application.

Figure 2A:
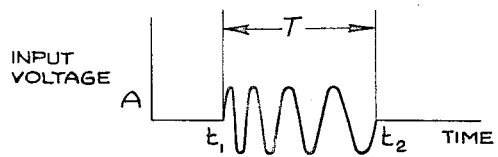
FIGS. 2A, 2B and 2C illustrate the waveform received by the radar for the case of continuous-wave transmission without antenna scanning.
Figure 2B:
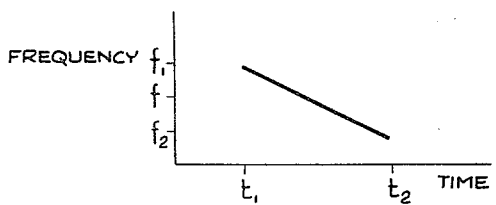

Reference may be had to the following publications for details of the components of synthetic aperture radars and data processors for pulse modulated, frequency modulated waveforms of the type produced by the receiver;

L. J. Cutrona et al "On the Application of Coherent Optical Processing Techniques to Synthetic Aperture Radar" Proc IEEE Vol 54 No 8 August 1966;

W. M. Brown and L. J. Porcello "An Introduction to Synthetic Aperture Radar" IEEE Spectrum September 1969;

U. S. Pat. No. 3,178,711 to Case on High Resolution Scanning Radar;

R. O. Harger "Synthetic Aperture Radar Systems Theory and Design" Academic Press 1970;

M. I. Skolnik "Introduction to Radar Systems" McGraw Hill 1962, particularly pp 136–137, 446, and 493–498;

C. E. Cook and M. Bernfield "Radar Signals" Academic Press 1967;

W. D. Squire et al "Linear Signal Processing and Ultrasonic Transversal Filters" IEEE Tran on Microwave Theory and Techniques Vol MTT–17 No 11 November 1969. In order to describe the nature of the received waveform reference is made to FIGS. 2A, 2B and 2C. A well known fact of a synthetic aperture radar is that the doppler shift $f_d$ is proportional to the distance $x$ between the object being viewed and the antenna line of sight. Mathematically:

$$f_d = 2vx/\lambda R \qquad (1)$$

where $v$ = relative velocity of object in direction normal to the radar line of sight
$\lambda$ = wavelength
$R$ = range between radar and object Therefore, at any range $R$, the doppler shift $f_d$ is a linear function of $x$, the object offset from the radar line of sight, and a frequency analysis of the return displays the radar reflectivity of the object which is being scanned as a function of $x$. The instantaneous doppler signals, each with doppler shift $f_d$, are delayed and then serially processed over a time period T which corresponds to the time during which the object is scanned by the radar beam(s). If the transmission from the radar is continuous-wave (CW) then the signal reflected by the object in the direction of the receiver consists of a rectangular pulse of frequency modulation (FM) of duration T as shown in FIG. 2A. Not shown in the figure is the effect of modulation which is due to antenna scan, to be discussed later. If the target motion is uniform, the frequency modulation of the received waveform FIG. 2A, decreases uniformly between frequency $f_1$ at time $t_1$ to frequency $f_2$ at time $t_2$, where $t_2 - t_1 = T$ and $f_2 - f_1 = B'_x$ and f is the carrier frequency, as shown in FIG. 2B.

Figure 2C:
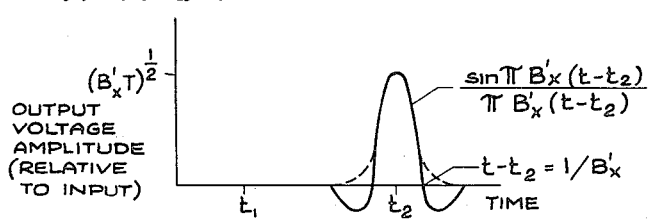

The input signal which is shown by way of illustration in FIG. 2A as a flat pulse of FM is in actuality tapered to the actual shape of the radar beam and the curvature of the returned wavefront. This fact provides a better time sidelobe response than the output voltage shown in FIG. 2C. The output signal shown in FIG. 2C represents the input described in FIG. 2A as a flat pulse of FM. This output is a $(\sin y)/y$ type pulse with $y = \pi B'_x (t - t_2)$ and is shown as the solid line pulse in FIG. 2C. It is a well known fact that the effect of tapering the input pulse is to decrease the time sidelobes in the output pulse at the expense of increasing the output pulse main width. The dashed line pulse in FIG. 2C describes the general effect of tapering the input pulse by the shape of the beamwidth employed. The dashed curve represents the envelope of sidelobes which result by tapering the input pulse and are always significantly below the sidelobes shown for the solid pulse. Thus, objects being resolved in angle by the real time synthetic radar of the present invention will appear in the same sequence with resolution between objects of the order of $1/B'_x$, where $B'_x$ is the bandwidth of the doppler frequency modulation which appears in the received waveform.

Figure 3:
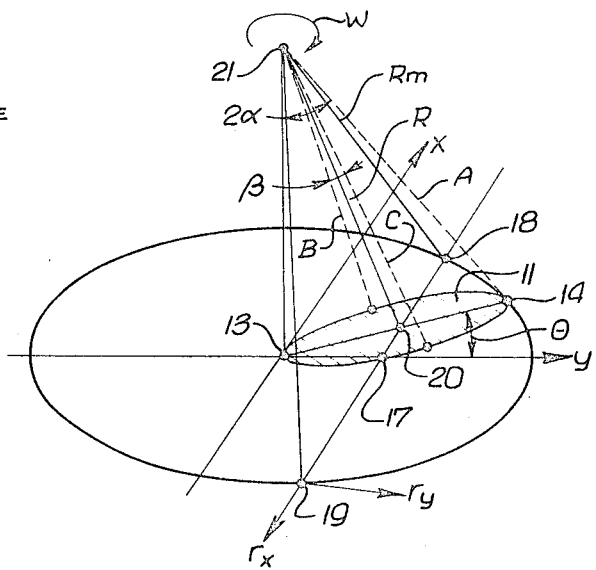
FIG. 3 illustrates the system geometry for the case of a conical scan.

The basic geometry of the system operation is illustrated in FIG. 3. The radar 21 is located at distance H from point 13. The antennas perform a conical scan about the reference line 8 with angular velocity $\omega$. The combined transmitting-receiving beamwidth illuminates the shaded area 11 on the x–y plane which is perpendicular to the reference line 8. The shaded area 11 has a beam width $\beta$. The antenna rotation $\omega$ causes the shaded area 11 to rotate about the fixed point 13. The point 14 of the illuminated area 11 thus describes a circle 15 which lies in the x–y plane. Other scanning geometries are also possible.

Shown in the figure are two target paths in the direction x; the first passing through the point 13 and the second passing through point 17 which is displaced from point 13 by the distance $R_y$. A target on the path through point 17 enters the one of scan circle 15 at point 18 and departs at point 19. The point 17 is the halfway point between points 18 and 19. Points 18 and 19 correspond to the clock times $t_1$ and $t_2$ of FIG. 2A, respectively. A target 20 in transit between points 18 and 19 will produce a series of pulses of duration $\beta/\omega$ at the radar located at point 21 these pulses extending over a time period $T = L/v$ where L is the distance between points 18 and 19 and v is the target velocity in the direction x. The pulses of width $\beta/\omega$ therefore modulate the waveform of FIG. 2A which has been given as a CW waveform with FM modulation due only to doppler. It can be shown that L is the length of synthetic aperture for the target path through point 17 and may be increased by increasing the cone of scan angle $2\alpha$. Furthermore, a synthetic aperture of area $L^2$ operates on the $R^2$ power law instead of the $R^4$ power law of conventional radar.

Each resulting pulse therefore contains range, angular, and doppler information. The pulses are separated by time periods which equal the period of the scan of rotation $2\pi/\omega$ plus a variable time $\tau$ which can be shown to be both range and angle dependent. The variable time $\tau$ is given by the following approximation:

$$\tan \omega\tau = 2\pi(v/\omega)\cos^2\theta/R_y + \pi(v/\omega)\cos 2\theta \qquad (2)$$

The shaded area 11 is inclined to the y axis by the angle $\theta$. The position of the target 20 can therefore be designated as having range $R_y$ and angle $\theta$, relative to the point 13. Other coordinate designations may serve equally well.

An object 20 which lies in the x–y plane will therefore be illuminated by the antenna for a time period $T = t_2 - t_1$, where T is the duration of the illumination period and $t_2 > t_1$ are clock times. The object 20 moves in the direction x relative to the radar 21. The direction x is tangent to the circle in the x–y plane with center at the fixed point 13 and radius $R_y$ between points 13 and 17. R is the range between the object 20 and the radar 21 while $R_m$ is the maximum range illuminated by the radar. The distance L is the distance over which the object 20 is illuminated while in transit of the circle 15, in the direction x. The beam-width or angle of scan in the plane normal to the plane defined by points 13, 14, and 21 and which contains the line 7 of FIG. 1 is designated by $\beta$.

As pointed out previously, the doppler shift $f_d$ is at any instant of time is a linear function of x so that if the output of the radar is coherently filtered, the target signal will appear at the signal position $f_d$ given by equation (1). If the target is viewed for a total in-transit period $T = L/v$ seconds, where the distance L spans the length of the target path illuminated by the radar, the resulting unmodulated doppler or information bandwidth $B'_x$ is given as:

$$B'_x = 2vL/\lambda R_m \qquad (3)$$

where v = relative velocity of object in direction x
L = distance between points 18 and 19
$\lambda$ = wavelength
$R_m$ = distance between points 18 and 21

The angular radar resolving power of the synthetic radar is:

$$r_x = v/B_x \qquad (4)$$

where $B_x = (\beta/2\pi)B'_x$ is the modulated doppler bandwidth where, upon substitution of equation (3), it can be shown that $r_x$ is a linear dependence of the actual antenna aperture size being independent of range and wavelength.

The range resolving power of the synthetic radar is determined by the requirement to eliminate crosstalk between channels representing adjacent target paths and is given by:

$$r_y = v/B_y \qquad (5)$$

where $B_y$ is the range bandwidth to be discussed later. Crosstalk is defined as the response of an adjacent channel to a signal in a given channel.

A conventional synthetic radar of the non-scanning variety is characterized, in FIG. 3, by the fact that $\beta = 2\pi$, i.e., the beamwidth $\beta$ is identical with the cone of scan 15. If this were to be the case, the target along the path through point 17 would produce a descending chirp pulse of bandwidth $B'_x$ and time duration T at the radar 21, the case exactly described in FIG. 2A. It is a well known technique in pulse compression radar to compress this pulse to a narrow width $1/B'_x$ in angle. In this manner, conventional synthetic radar systems achieve angular resolutions on the order of one wavelength $\lambda$ if the system is focused and on the order of the square-root of the wavelength-target range product $(\lambda R)^{1/2}$ if the system is not focused.

In the system of the present invention, the continuous pulse of bandwidth $B'_x$ and duration T is now pulse modulated with pulses of approximate width $\beta/\omega$. The pulses are both range and angle dependent as well as functions of doppler. These pulses are compressed to a single pulse of approximate width $1/B_x$. The range bandwidth is given by the following approximation $$B_y = (v/2R_y\omega) B_x \qquad (6)$$

Equation (6) gives the range bandwidth $B_y$ of the system of the present invention which now may be used in equation (5). It can be seen that $B_y = B_x$ when $\omega = v/2R_y$. The conventional synthetic radar may therefore be considered as but a special case of the system of the present invention; that for which $B=2\pi_y$ and $\omega=0$. However, other settings for the parameters $\beta$ and $\omega$ may also be utilized in the present invention.

The functional difference between the system of the present invention and conventional synthetic radar of either the scanning or non-scanning varieties is that the former system not only produces range information but does so without using pulse of modulating type transmissions. In the system of the present invention, it is possible to know the location of a target during its transit of the cone of scan 15 with extremely high resolution and small size, weight, and power equipment.

It will be recognized that the pulse of duration T, FIG. 2A, subsequently described as being modulated by pulses of width $\beta/\omega$ and separated by time periods $2\pi/\omega$ plus the variable time $\tau$ is a pulse compression type pulse with linear frequency modulation, $f_d$ given by equation (1). This type pulse normally occurs by bouncing a pulse compression type waveform off a stationary target. Thus, unmodulated CW transmitter operation completely eliminates the need for a complex transmission waveform for range and velocity resolution, a complex receiver for matching moving targets, and a complex antenna for angular resolution of objects. Each of the above effects significantly reduces the size and weight of hardware in the preferred configuration of the present invention, namely unmodulated CW transmitter operation.

Figure 4:
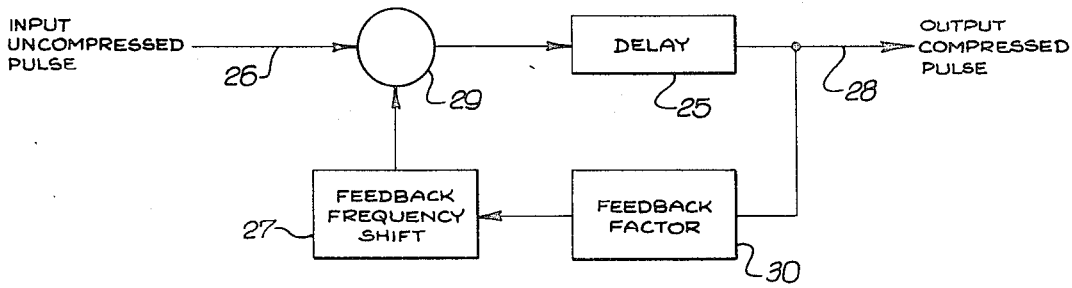
FIG. 4 is a block diagram of a preferred design for the real time data processor of FIG. 1 in a single channel of the system.

Various forms of data processors can be used in the system of FIG. 1, such as a pulse compressor filter, a matched filter, an auto correlation unit, and a cross correlation unit. The presently preferred real time data processor isan fm recirculating delay line as illustrated in FIG. 4, and includes a delay unit 25 of fixed delay $2\pi/\omega$ and variable delay $\tau$, a feedback curcuit with an amplifier 30 and frequency shifter 27, and a mixer 29. A pulse of width $\beta/\omega$ appearing at the input 26 is delayed in time by $(2\pi/\omega)+\tau$ following which it is shifted in frequency by the amount $(2\pi/\omega)+\tau)B'_x /T$ in the frequency shifter 27. The resulting pulse at the output 28 is integrated or multiplied in mixer 29 with the succeeding pulse appearing at input 26. The two pulses coincide for the target coordinate location $R_y$, $\theta$ following each delay period $(2\pi/\omega)+\tau$. In practice the variable delay period $\tau$ may be either swept to accommodate all occuring delay periods $\tau$ between pulses in the modulated train of pulses from a given target or it may be approximated by a fixed delay period $\bar{\tau}$ which can be obtained by averaging equation (2) between the limits of angle $\theta$ (in FIG. 3). The fm recirculating delay line of FIG. 4 defines a single channel of the system of the present invention, i.e., corresponding to a given target track at range $R_y$. In general, data processor 5 consists of a number of channels. The amplifier 30 provides a gain slightly less than unity.

The output compressed pulse appearing at the output 28 is a function both of target range $R_y$ and angle $\tan^{-1}(L/2R_y)$ and is obtained as a correlation or coincidence between two or more successive pulses in the received pulse train. The output pulse is therefore a sum or product of a succession of pulses which have been made coincident in time and frequency. The exact number of pulses equals the number of scans of the target and is given as $n = \omega T/2\pi$. The output pulse occurs at the clock time $t_2$ of FIGS. 2A – 2C and at the spatial location indicated by point 19 of FIG. 3. Its spatial resolution is illustrated by the local vectors $r_x$ and $r_y$ in FIG. 3. These vectors have magnitudes given by equations (4) and (5). The output compressed pulse appearing at the output 28 therefore indicates the target position both in range and in angle.

A review of equations (4) through (6) indicates the effect which the scan modulation, used to obtain target range in the system of the present invention, has on the angular resolution. Namely, the scan modulation modifies the system bandwidth from $B'_x$ to $B_x$. Since, $B_x \leq B'_x$, the overall effect is to reduce the system resolution, decrease the number of range channels, and decrease the range accuracy requirement of each channel. Thus, range capability is obtained in the system of the present invention by modifying the system bandwidth otherwise available in the unmodulated non-scanning system. It can be readily determined from equation (6) that for many applications it is possible to select the beamwidth $\beta$ and scan rate $\omega$ so that the information bandwidth $B_y$ of the present invention may equal, exceed, or be less than the information bandwidth $B_x$. The exact settings for the parameters $\beta$ and $\omega$ of the system of the present invention are determined by the application at hand.

In general, the required processing in data processor 5 can be viewed as a weighted vector-summation process or operation, a matched filter operation, or a correlation operation. The three viewpoints are completely equivalent. For whichever viewpoint is chosen, a certain hardware configuration will result to process the signal. It is a well known fact, however, that in a conventional synthetic radar, the necessary processor is prohibitively cumbersome and expensive for many applications, especially for large scale scanning operations which require large pulse bandwidth. The output of the radar receiver in these applications typically has a bandwidth W of the order of one GHz, so that the data processor must accept data at a commensurate rate. It was recognized, in the development of conventional synthetic radar, that photographic film was well suited to the task of storing the data. The data could be stored and later read out optically. This could be accomplished with satisfactory size and weight equipment. Data storage, however, effectively precludes real time operation of the radar system. The present invention corrects this deficiency for many applications where both small size and weight equipment and real time operation are in demand. Typically, the output of the radar receiver 3 in the system of the present invention had a bandwidth of the order of a few tens of KHz so that the demand upon the data processor 5 is quite low when compared to that of a conventional system. This makes it particularly convenient to process the data locally or remotely, as the application may require.

In the selection of a suitable data processor 5, the size and weight of the hardware increase more or less linearly with the system bandwidth-duration product. Therefore, in many applications, the size and weight of equipment increase as the bandwidth-duration product increases. To keep the size and weight of the system and data processor 5 at an acceptable level, both the system bandwidth and time duration must be kept small.

In the system of the present invention the doppler bandwidth $B_x$ determines the system bandwidth while the transit time $T$ determines the system duration of operation. Since the bandwidth $B_x$ is considerably smaller than GHz system bandwidths W required in conventional modulated CW or pulsed systems, the system of the present invention can be expected to be considerably smaller in size and weight than such conventional systems. This is true by virtue of the fact that system size and weight is more or less a linear function of the system bandwidth-duration product. Furthermore, an additional size and weight saving can be obtained if the data processor 5 is designed as a bank of one or more recirculating delay lines. Such a configuration for the data processor 5 is shown in FIG. 4 for a single channel. Indicated in the figure is a single matched filter which operates as a combined correlator, for range correlation of targets in successive scans of the beam, and compression circuit, for the compression of doppler frequences needed for angular measurements. This is accomplished by delaying the input signal 26 by the fixed amount $2\pi/\omega$ plus the variable amount $\tau$ as discussed previously and following this, shifting the frequency by the corresponding amount $(2\pi/\omega) + \tau)B'_x/T$. The variable range of time differentials $\tau$ is implemented as a time delay in the forward path of the feedback loop while the variable frequency shift $\tau B'_x/T$ is implemented in the feedback portion of the feedback loop. The demand on the delay line is that it can pass the shortest pulse in the system, namely the pulse of duration $1/B_x$ which results from compression of doppler frequencies, and delay signals by the amount $5\pi/2\omega$ which is the maximum possible time delay $(2\pi/\omega) + \tau$. Therefore, the bandwidth-duration product for the data processor hardware is in effect $B_x(5\pi/2\omega)$ which is considerably less than $B_xT$, the system bandwidth-duration product the full implementation of which would result in a larger data processor 5. Of course, either implementation of the system of the present invention results in a system bandwidth-duration product which is significantly less than WT, i. e., that required in a conventional synthetic radar system.

In FIG. 4, the uncompressed pulses of duration $\beta/\omega$ which appear at the input 26 to the data processor 5 are passed to the matched filter which consists of the fixed and variable delays as described previously in the forward path of the feedback loop. The feedback path of the feedback loop consists of a feedback factor 30 which is set to a value slightly less than unity for stable operation of the loop. The feedback signal is therefore delayed in time and frequency shifted, at the correct interscan differential time and frequency for each target range present, and then combined with the next pulse in the signal pulse train and continuing this process over the time period $T$. This is a standard operation requiring conventional radar processing techniques. In practice, the real time data processor 5 can be implemented as a phase or frequency correcting integrator or multiplying correlator. This particular configuration of the data processor 5 requires a hardware bandwidth-duration product which tends in the limit to unity in systems with overall bandwidth duration product $B_xT$, the full implementation of which would result in a data processor 5 of considerably larger size and weight. Thus, in its theoretical limit, the system of the present invention has a bandwith duration product which approaches unity whereas conventional synthetic radar systems of gigahertz bandwidths W require bandwidth-duration products of the order WT, the full implementation of which result in cumbersome system size and weight and often as sotred time operations.

Basically, the data processor integrates a series of input pulses to provide a single short output pulse. The doppler modulation of the input pulses determines the width of the output pulse (resolution) while the time of occurrence of input pulse (coinciding with scannings) and the separation of pulses in the pulse train determines the target coordinates at the instant of the pulse at the output.

In practice, a pulse at the output of a conventional radar conveys angle and range coordinates of the target with a certain resolution. The angle is obtained by the antenna position, its resolution by the physical or synthetic antenna beamwidth; the range is obtained by the target range echo (delay between transmit and receive), its resolution by the pulse width. In the system of the present invention, the output pulse conveys angle and range coordinates and their resolutions but does so in a different way for range. The angle is obtained in the conventional manner by the position of the antenna, its resolution by the synthetic antenna beamwidth (much smaller than the physical antenna beamwidth); the range is obtained by the target "angle" echo (delay between two successive scans of the antenna), its resolution by the synthetic antenna beamwidth. To visualize matters, a conventional radar correlates pulses, for instance, it compares the echo pulse with the transmitted pulse (occurring at fixed intervals); the present radar correlates synthetically generated (extremely narrow) beamwidths, for instance, it compares the beamwidth in a given direction with the north pointing beamwidth (occurring at fixed (scanning) intervals) to obtain a delay which is a function of tha target range, i.e., containing range information. The processor solves this function for the range coordinate. Thus, in the present invention, the range coordinate is obtained without the need of a pulse echo as in conventional systems.

Using the real time synthetic radar of the present invention therefore allows for a significant reduction of the system size and weight in real time operations. The reduction in size and weight has been accomplished through the use of unmodulated CW operation, synthetic antenna(s), narrowband receiver, and a matched filter of feedback type. These simple steps are usually opposite those taken for the design of conventional radars.

Although a particular configuration of a real time synthetic radar has been described, it should be understood that the scope of the invention should not be considered to be limited by the particular embodiment of the invention shown by way of illustration, but rather by the appendant claims.

What is claimed is:

1. A coherent synthetic aperture radar including transmitter, receiver, local oscillator and data processor, said transmitter including an antenna providing a transmitter beam along a boresight axis and means for scanning said beam about a scan axis, said reciver including an antenna for receiving signals from storage illuminated by the scanning transmitter beam, with said oscillator providing a common reference frequency for said transmitter and receiver, with said data processor having as an input from the receiver output, a pulse modulated, frequency modulated signal in the form of a chirp pulse train echo from a target illuminated by repeated scanning, with the chirp due to target doppler and the pulse train due to scanning over the target, and with said data processor providing an output signal in the form of a short pulse following a number of illuminations of a target by scanning, with the time of occurrence and separation of pulses in the pulse train of the input signal providing the coordinates and resolution of coordinates for each occurrence of the data processor output signal pulse.

2. Apparatus as defined in claim 1 wherein said transmitter is a CW transmitter.

3. Apparatus as defined in claim 1 wherein said transmitter is a pulsed transmitter.

4. Apparatus as defined in claim 1 wherein said transmitter and receiver have a common antenna.

5. Apparatus as defined in claim 1 wherein said transmitter and receiver have separate antennae.

6. Apparatus as defined in claim 1 wherein said data processor is a real time data processor.

7. Apparatus as defined in claim 1 wherein said data processor includes a pulse compression filter.

8. Apparatus as defined in claim 1 wherein said data processor includes a matched filter.

9. Apparatus as defined in claim 1 wherein said data processor includes an autocorrelation unit.

10. Apparatus as defined in claim 1 wherein siad data processor includes a cross correlation unit.

11. Apparatus as defined in claim 1 wherein said data processor includes a fm recirculating delay line.

12. Apparatus as defined in claim 1 wherein said data processor includes:

a delay line having an input and an output, with the delay line output providing the data processor output signal pulse;

a mixer having first and second inputs and an output, with the mixer output connected to the delay line input and with the data processor input connected to the first mixer input; and a feedback circuit connected between the delay line output and the second mixer input, and including an amplifier having a gain of less than unity and a frequency shifter for shifting the frequency of the feedback signal at the second mixer input to that of the input signal at the first mixer input.

13. Apparatus as defined in claim 1 wherein said transmitter is a CW transmitter and said data processor includes a fm recirculating delay line operating in real time.

14. Apparatus as defined in claim 1 wherein said antenna has a beamwidth $\beta = 2\pi$ and a scan rate $\omega = 0$.

* * * * *

UNITED STATES PATENT AND TRADEMARK OFFICE
CERTIFICATE OF CORRECTION

PATENT NO. : 3,790,939
DATED : February 5, 1974
INVENTOR(S) : Constant

It is certified that error appears in the above-identified patent and that said Letters Patent are hereby corrected as shown below:

Column 2 lines 33-34 change "exposure" to --expense--

Column 5 line 11 change "processor" to --processors-- line 45 change "of" to --at--

Column 8 line 35 before "at" delete "is"

Column 9 line 29 replace "B = $2\pi_y$" by --$\beta = 2\pi_y$-- line 62 change "isan" to --is an--

Column 11 line 10 change "had" to --has--

Column 13 line 23 change "reciver" to --receiver-- line 24 change "storage" to --targets--

Signed and Sealed this

First Day of March 1983

[SEAL]

Attest:

GERALD J. MOSSINGHOFF

Attesting Officer      Commissioner of Patents and Trademarks